United States Patent
Kurtz et al.

(10) Patent No.: US 9,915,820 B2
(45) Date of Patent: Mar. 13, 2018

(54) PROJECTOR OPTIMIZED FOR MODULATOR DIFFRACTION EFFECTS

(71) Applicant: IMAX EUROPE SA, Brussels (BE)

(72) Inventors: Andrew F. Kurtz, Macedon, NY (US); Gary E. Nothhard, Hilton, NY (US)

(73) Assignee: IMAX Theatres International Limited, Dublin (IE)

( * ) Notice: Subject to any disclaimer, the term of this patent is extended or adjusted under 35 U.S.C. 154(b) by 0 days.

(21) Appl. No.: 14/776,350

(22) PCT Filed: Mar. 15, 2013

(86) PCT No.: PCT/US2013/032088
§ 371 (c)(1),
(2) Date: Sep. 14, 2015

(87) PCT Pub. No.: WO2014/142967
PCT Pub. Date: Sep. 18, 2014

(65) Prior Publication Data
US 2016/0033757 A1    Feb. 4, 2016

(51) Int. Cl.
*G02B 26/00* (2006.01)
*G02B 26/08* (2006.01)
(Continued)

(52) U.S. Cl.
CPC ..... *G02B 26/0833* (2013.01); *G02B 26/0808* (2013.01); *G03B 21/008* (2013.01);
(Continued)

(58) Field of Classification Search
None
See application file for complete search history.

(56) References Cited

U.S. PATENT DOCUMENTS 4,217,040 A    8/1980    Longerbeam et al.
4,441,791 A    4/1984    Hornbeck
(Continued)

FOREIGN PATENT DOCUMENTS

CN    101238397    8/2008
CN    102239437    11/2011
(Continued)

OTHER PUBLICATIONS

European Patent Application No. 13715807.7, Office Action dated Mar. 16, 2017, 8 pages.
(Continued)

*Primary Examiner* — Brandi Thomas
(74) *Attorney, Agent, or Firm* — Kilpatrick Townsend & Stockton LLP

(57) ABSTRACT

An optical system that includes a micro-mirror array optical modulator that can selectively modulate an incident light beam having a defined narrow spectral bandwidth to encode data thereon based on commands to an ON-state or an OFF-state of a micro-mirror. The micro-mirror array optical modulator can redirect light by diffraction and reflection to provide an output modulated light beam that exhibits a diffraction handedness dependent described by an arrangement of diffraction orders that depend in part on the narrow spectral bandwidth of light incident thereupon. An optical element has an optimized limiting aperture for defining portions of a modulated light beam that are blocked and remaining portions that are transmitted. An ON-state efficiency and an OFF-state contrast of an optically transmitted modulated light beam can depend on the diffraction handedness of the output modulated light beam relative to a size and a shape of the optimized limiting aperture.

22 Claims, 12 Drawing Sheets

(51) Int. Cl.
*G02F 1/29* (2006.01)
*G03B 21/00* (2006.01)
*G03B 21/20* (2006.01)
*H04N 9/31* (2006.01)
*H04N 5/74* (2006.01)

(52) U.S. Cl.
CPC ....... *G03B 21/2033* (2013.01); *H04N 5/7458* (2013.01); *H04N 9/3105* (2013.01); *H04N 9/3161* (2013.01); *H04N 9/3164* (2013.01)

(56) References Cited

U.S. PATENT DOCUMENTS

| | | | |
|---|---|---|---|
| 4,680,579 | A | 7/1987 | Ott |
| 5,192,946 | A | 3/1993 | Thompson et al. |
| 5,535,047 | A | 7/1996 | Hornbeck |
| 5,552,922 | A | 9/1996 | Magarill |
| 5,600,383 | A | 2/1997 | Hornbeck |
| 5,982,553 | A | 11/1999 | Bloom et al. |
| 6,089,717 | A | 7/2000 | Iwai |
| 6,154,259 | A | 11/2000 | Hargis et al. |
| 7,008,065 | B2 | 3/2006 | English, Jr. et al. |
| 7,321,473 | B2 | 1/2008 | Liu |
| 7,400,458 | B2 | 7/2008 | Farr |
| 7,926,951 | B2 | 4/2011 | Bietry et al. |
| 8,342,690 | B2 | 1/2013 | Coleman et al. |
| 2002/0126264 | A1 | 9/2002 | Dewald et al. |
| 2003/0091279 | A1 | 5/2003 | Dho |
| 2003/0202259 | A1 | 10/2003 | Nishimae et al. |
| 2005/0140933 | A1 | 6/2005 | Cannon et al. |
| 2005/0206770 | A1 | 9/2005 | Nathanson et al. |
| 2006/0227069 | A1 | 10/2006 | Baselmans et al. |
| 2007/0013880 | A1 | 1/2007 | Fushimi et al. |
| 2007/0014114 | A1 | 1/2007 | Barazza |
| 2009/0009732 | A1 | 1/2009 | Maeda et al. |
| 2009/0161193 | A1* | 6/2009 | Maeda ............... G02B 26/0833 359/263 |
| 2012/0038892 | A1 | 2/2012 | Kurtz et al. |
| 2012/0194787 | A1 | 8/2012 | Sawai |
| 2013/0188154 | A1 | 7/2013 | Tomioka |

FOREIGN PATENT DOCUMENTS

| | | |
|---|---|---|
| EP | 1434078 | 6/2004 |
| JP | 11084271 | 3/1999 |
| JP | 2003322822 | 11/2003 |
| JP | 2007517261 | 6/2007 |
| JP | 2007527159 | 9/2007 |
| JP | 2008146085 | 6/2008 |
| JP | 2011164599 | 8/2011 |
| JP | 2012159556 | 8/2012 |
| JP | 2013148702 | 8/2013 |
| TW | 200616450 | 5/2006 |
| TW | 200636373 | 10/2006 |
| WO | 2006035279 | 4/2006 |
| WO | 2013151747 | 10/2013 |

OTHER PUBLICATIONS

Japanese Patent Application No. 2016-500061, Office Action dated Feb. 7, 2017, 9 pages (5 pages of Original document and 4 pages of English Translation).
Texas Instruments, "Using Lasers with DLP® DMD technology," TI Tech Note TI DN 2509927, Sep. 2008, 9 pages.
Bottema, "Echelle Efficiency and Blaze Characteristics", SPIE Proc. vol. 240, 1980, pp. 171-176.
Dewald et al., "46.1: Invited Paper: Advances in Contrast Enhancement for DLP Projection Displays", 2002 SID International Symposium, May 21, 2002, pp. 1246-1248.
Dewald et al., "Optical Model of DMD Device in DLPa Projection System", IDW, LAD2-1 Invited, Jan. 1, 2003, pp. 1557-1560.
PCT/US2013/032088, "International Search Report & Written Opinion", dated Oct. 30, 2013, 16 pages.
Rice et al., "DMD diffraction measurements to support design of projectors for test and evaluation of multispectral and hyperspectral imaging sensors", Published in the SPIE Proc., vol. 7210, 2009, 9 pages.
Ryoo et al., "Analysis of the effective reflectance of digital micromirror devices and process parameters for maskless photolithography", Paper, Microelectronic Engineering, vol. 88, 2011, 5 pages.
Silverstein et al., "A Laser-Based Digital Cinema Projector", SID Symposium Digest, vol. 42, No. 1, Jun. 2011, pp. 326-329.
Zheng et al., "Laser Digital Cinema Projector", Journale of Display Technology, vol. 4, No. 3, Sep. 2008, pp. 314-318.
Chinese Patent Application No. 201380074568.1, Office Action dated May 27, 2017, 10 pages (4 pages of English translation and 6 pages of original document).

* cited by examiner

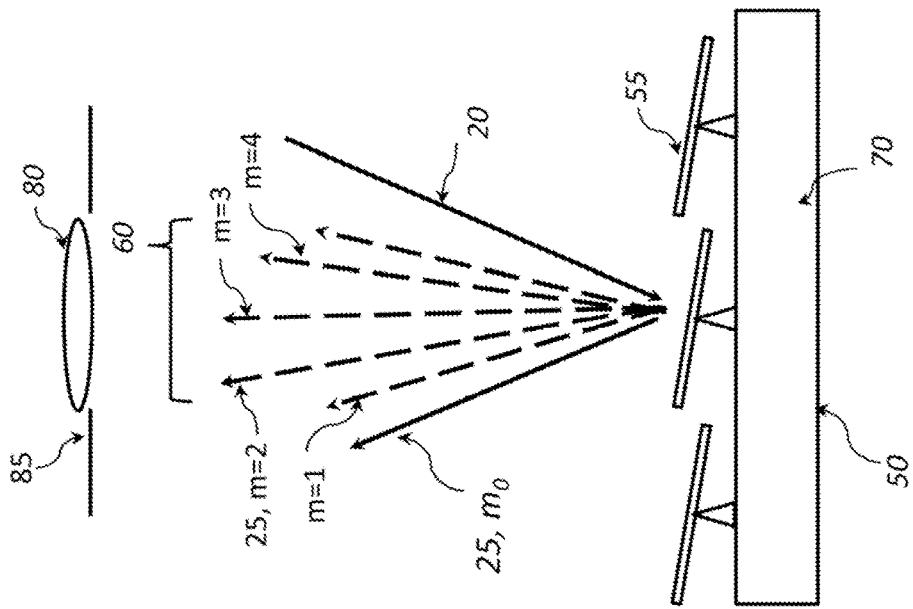
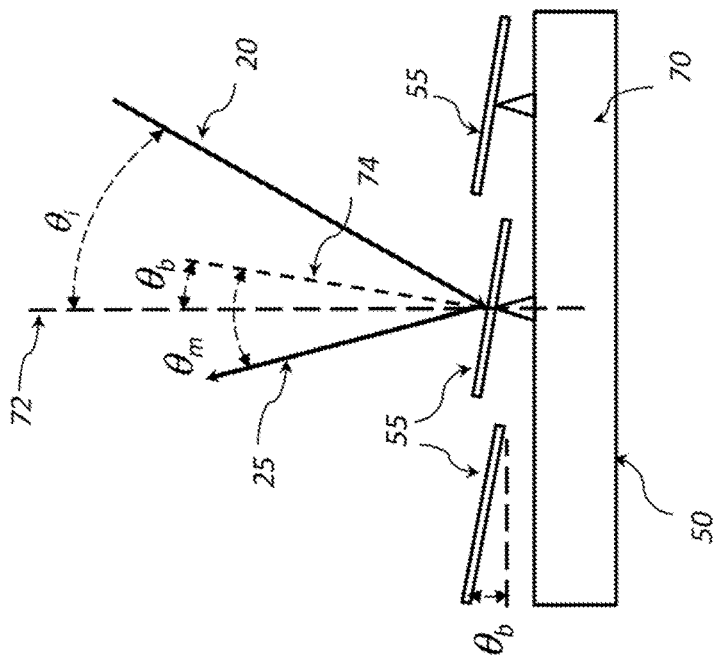
FIG. 3b
FIG. 3a

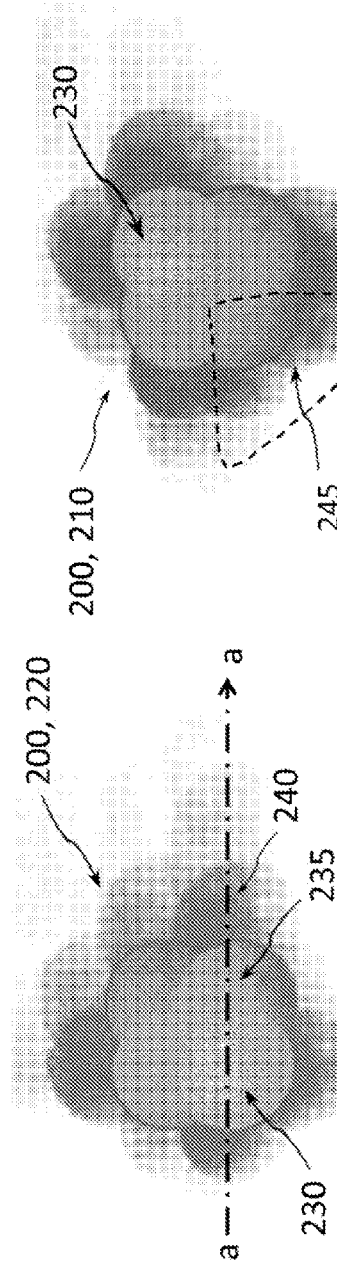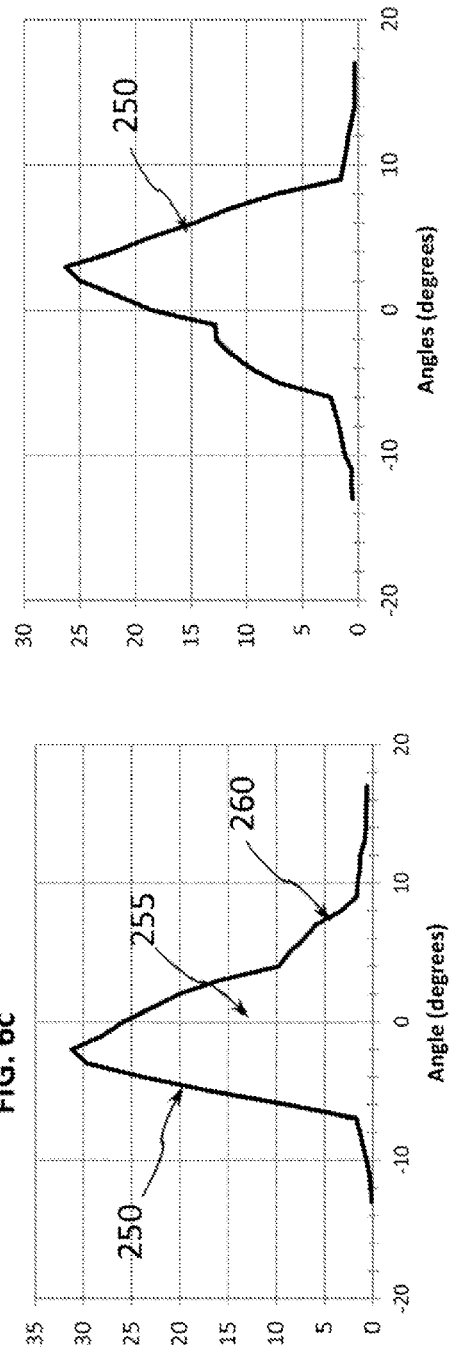

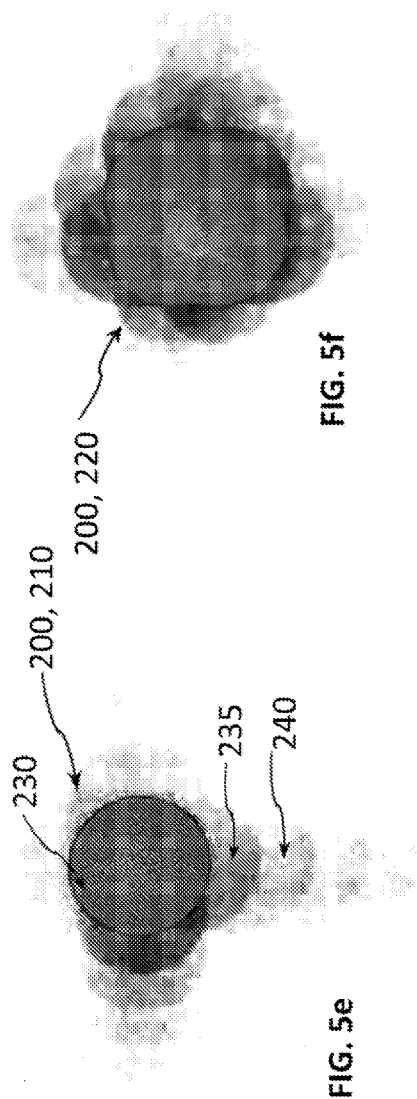
FIG. 5e
FIG. 5f
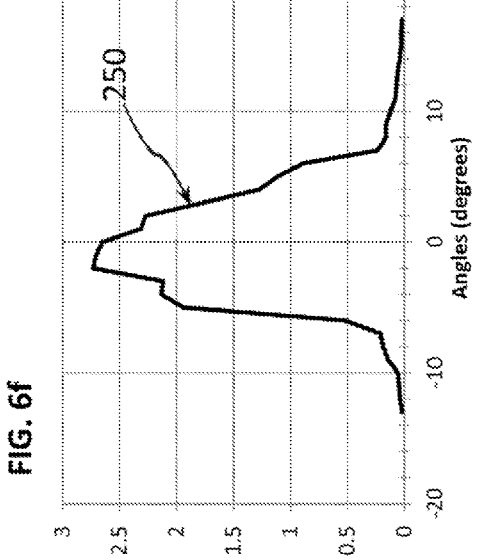
FIG. 6e
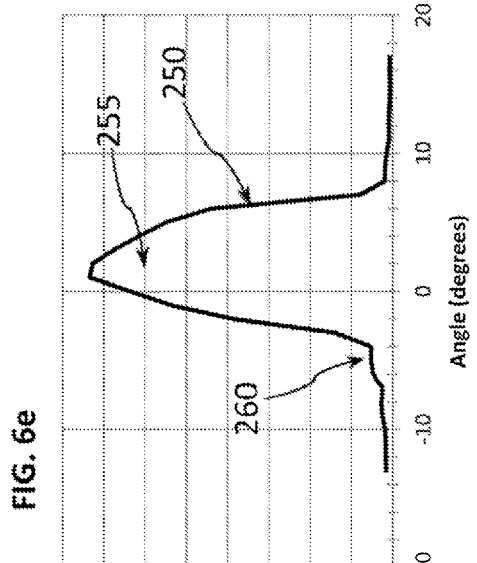
FIG. 6f

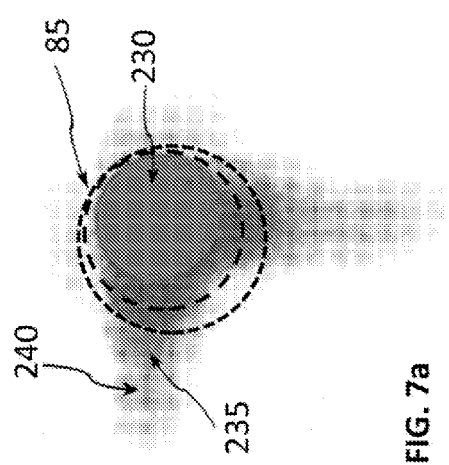
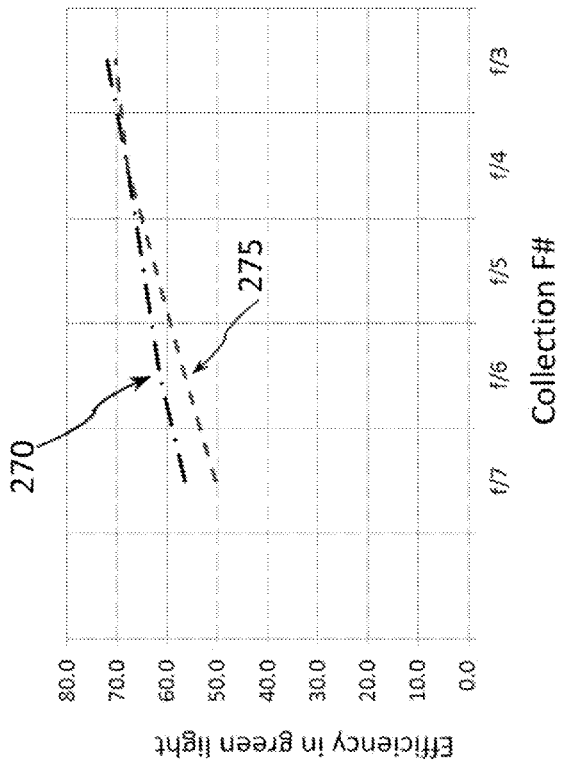
FIG. 7a
FIG. 7b

PROJECTOR OPTIMIZED FOR MODULATOR DIFFRACTION EFFECTS

CROSS REFERENCE TO RELATED APPLICATIONS

This is a U.S. national phase under 35 U.S.C. 371 of International Patent Application No. PCT/US2013/032088, titled "Projector Optimized for Modulator Diffraction Effects" and filed Mar. 15, 2013, which is incorporated herein by reference in its entirety.

The present disclosure is related to International Patent Application No. PCT/US2013/032067, titled "Color Dependent Aperture Stop," filed Mar. 15, 2013.

TECHNICAL FIELD

The present disclosure generally relates to digital image projection and more particularly to a coherent light projection system optimized for use with micro-mirror array spatial light modulators exhibiting diffractive effects.

BACKGROUND

The motion picture industry is presently transitioning from traditional film-based projectors to digital or electronic cinema. This trend is accelerating due to the popularity of three-dimensional (3-D) movies. Even as digital cinema projection has matured and succeeded, largely based on the use of Digital Light Projection (DLP) technology, both the light sources and the DMD modulators have been evolving. In the case of lasers, high power compact visible lasers are becoming increasingly mature and cost competitive, enabling the development of laser digital cinema projectors. One such system is described in the paper "*A Laser-Based Digital Cinema Projector*", by B. Silverstein et al. (SID Symposium Digest, Vol. 42, pp. 326-329, 2011).

At the core of the DLP technology, which was developed by Texas Instruments, is the digital micro-mirror device (DMD), which is a spatial light modulator that includes an array of micro-mirrors. DMD spatial light modulators have been successfully employed in digital projection systems, including digital cinema devices that meet the DC2K digital cinema resolution standard. Efficiency measurements have been performed on such systems that use the DC2K chip and have found the efficiency optimizing principles to be valid; however, for systems utilizing the new DC4K chip the principle was not found to work as well.

Early in the development of the DMD device technology, the individual micro-mirrors 55 or pixels were relatively large, at ~30 µm square. Subsequently, device resolution has improved, with progressively smaller pixels, evolving from ~17 µm square in the late 1990's, to 13.8×13.8 µm for the 2K digital cinema projectors (2005), and more recently, reaching 7.5 µm×7.5 µm pixels with the DC4K devices (2011). The projector described by Silverstein et al used 2K resolution DMD devices for image light modulation, and various aspects of DMD device behavior were taken into account. As another example, in the paper "*Laser Digital Cinema Projector*," by G. Zheng et al., published in the Journal of Display Technology, Vol. 4 (2008), a laser projector is described that also uses the DC2K versions of the DMD devices, but with conventional DLP projection optics, including the TIR and Philips prism assembly. Notably, both Silverstein et al and Zheng et al describe projectors using the DC2K versions of the DMD devices, meaning that they were compliant with the DC1 digital cinema projection specification and provided "2K" horizontal resolution.

However, as noted above, the recently released DC4K devices have much smaller pixels to support the higher horizontal resolution standard. As the size of the micro-mirrors decreases, diffraction effects become increasingly important, and the micro-mirror array can be thought of as a programmable blazed grating. Diffraction becomes an even larger concern when laser light interacts with these small pixel and sub-pixel features. Essentially, diffraction effects cause an efficiency loss versus a plane mirrored surface as some light is directed into other diffracted orders, which the blaze then partially restores.

Some aspects of the diffractive behavior of the DMD devices have been considered in the literature. In particular, Texas Instruments provided some guidance concerning the interaction of laser light, in their publication "Using Lasers with DLP® DMD technology", TI Tech Note TI DN 2509927, September 2008. However, additional practical guidance on the diffraction behavior that aids projector design is needed. A subsequent paper "*DMD diffraction measurements to support design of projectors for test and evaluation of multispectral and hyperspectral imaging sensors*", by J. P. Rice et al., published in the SPIE Proc., Vol. 7210 (2009) provides infrared (IR) light diffraction efficiency measurements for IR optimized 2K resolution DMD devices. However, this paper does not discuss the optical propagation behavior of the diffracted light, and how that might affect projector design, whether in the IR or other spectral ranges.

In summary, as micro-mirror array spatial modulators such as the DMD devices have migrated to yet smaller pixel dimensions, and laser projection systems have become increasingly feasible, the specifics of the interaction of the laser light with the micro-mirrors, which are dynamic diffractive structures, becomes more important. Therefore, opportunity exists to better understand the subtleties of micro-mirror array diffraction behavior and optimize projector design accordingly.

SUMMARY

In some aspects, an optical system can provide modulation of an incident light beam. The optical system includes an illumination source, a micro-mirror array optical modulator, and an optical element. The illumination source can provide the incident light beam that has a defined narrow spectral bandwidth. The micro-mirror array optical modulator can selectively modulate the incident light beam to encode data thereon based on commands to an ON-state or an OFF-state of one or more micro-mirrors. The micro-mirror array optical modulator can redirect light by both diffraction and reflection to provide an output modulated light beam that exhibits a diffraction handedness dependent described by an arrangement of diffraction orders that depend in part on the narrow spectral bandwidth of light incident thereupon. The optical element has an optimized limiting aperture for defining portions of a modulated light beam that are blocked and remaining portions that are transmitted. An ON-state efficiency and an OFF-state contrast of an optically transmitted modulated light beam acquired by the optical element can depend on the diffraction handedness of the output modulated light beam relative to a size and a shape of the optimized limiting aperture.

These illustrative aspects are mentioned not to limit or define the disclosure, but to provide examples to aid understanding thereof. Additional aspects and features are discussed in the Detailed Description, and further description is provided. Advantages offered by one or more of the various aspects and features may be further understood by examining this specification or by practicing one or more aspects and features presented.

BRIEF DESCRIPTION OF THE DRAWINGS

FIG. 3a depicts an example of light reflection and diffraction from a DMD micro-mirror array according to one aspect.

FIG. 3b depicts an example of emergence of diffracted orders from a micro-mirror array device according to one aspect.

FIGS. 5a-f depict close-up images of ON-state diffraction patterns from a micro-mirror array device according to certain aspects.

FIGS. 6a-f depict close-up images of cross-sectional profiles of ON-state diffraction patterns from a micro-mirror array device according to certain aspects.

FIG. 7a depicts an example ON-state diffraction pattern overlaid with optical apertures according to one aspect.

FIGS. 7b-e depict graphs of collection efficiency or contrast according to certain aspects.

DETAILED DESCRIPTION

Figure 1:
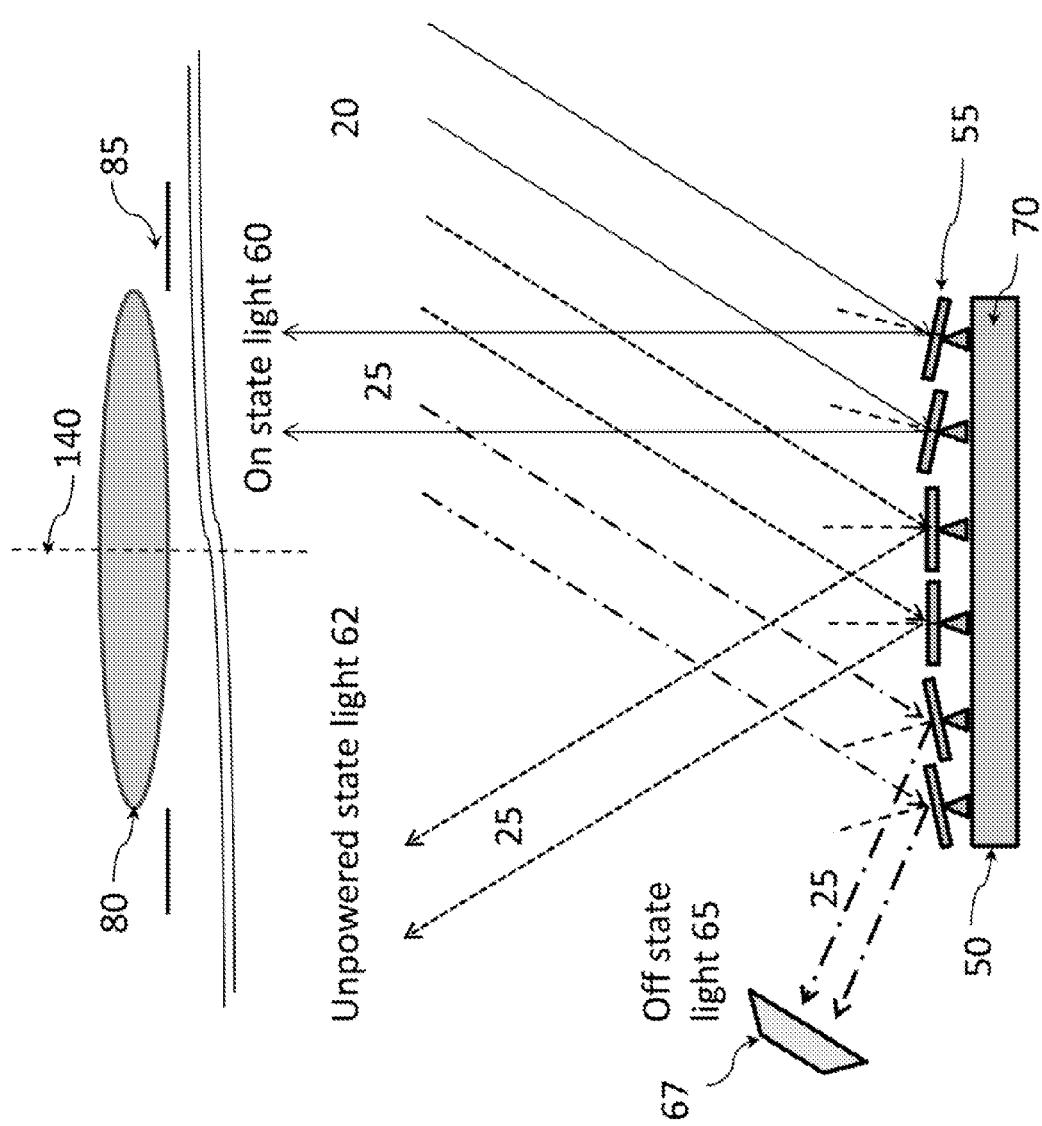
FIG. 1 depicts aspects of operation of a DMD micro-mirror spatial light modulator array according to one aspect.

The basic operation of an example of a DMD optical modulator device is depicted in FIG. 1, in which an incident light beam 20 interacts with a micro-mirror array 50 that includes micro-mirrors 55 formed on a substrate 70. The substrate 70 is typically a silicon wafer patterned with both electronics and the micro-electro-mechanical substructure (e.g., a hinge) that causes a given micro-mirror 55 (or pixel) to controllably tilt when signals are applied. These signals command one or more micro-mirrors to mirror positions corresponding to an ON-state or an OFF-state. FIG. 1 depicts the micro-mirrors 55 in three different states, the "ON-state" 60, the "OFF-state" 65, and an unpowered state 62. Incident light reflects off the front surfaces of the micro-mirrors 55, nominally, such that the angle of reflection from the surface normal equals the angle of incidence. For micro-mirrors 55 in the unpowered state 62, the emergent light beam 25 appears to nominally reflect as if it reflected from a plane mirror parallel to the front surface of the substrate 70. In a working projector, incident light is seldom applied to a micro-mirror array in the unpowered state 62. For micro-mirrors 55 in the ON-state 60, incident light is redirected to provide an emergent light beam 25 corresponding to ON-state light or image light, which transits to an optic 80 that has an aperture 85 and an optical axis 140. Optic 80 is an optical element having a limiting aperture, which typically is a lens or lens assembly. For micro-mirrors 55 in the OFF-state 65, incident light is redirected as an emergent light beam 25 for OFF-state light, which typically is captured and absorbed by a beam dump 67. DMD optical modulator devices are typically sorted for pixel defects, with devices having fewer pixel defects, and particularly fewer pixel defects in the central portion of the device, being used for green or red imaging channels instead of blue imaging channels.

As a diffraction grating, diffraction directionality is modeled by the grating equation, $m\lambda = d(\sin\theta_i \pm \sin\theta_m)$ and m is the diffraction order, d is the grating pitch, $\theta_i$ is the incident angle and $\theta_m$ is the output diffracted light angle. A blazed grating then has the pitch d of a conventional grating, but also tilted surfaces that direct optical flux into a particular order, increasing the efficiency thereof, while minimizing while the residual power to the other orders (particularly the zero$^{th}$). For micro-mirrors 55 in the ON-state 60, incident light is still nominally redirected as ON-state light in the direction dictated by a mirrored reflection, but with the efficiency altered by diffraction.

In the case of a projector in which the illuminating source has a spectral bandwidth $\Delta\lambda$ in a given color channel, the angular direction $\theta_m$ of the diffracted light changes for a given order m. Likewise, as the incident angle $\theta_i$ changes, as can happen if convergent light is directed at the micro-mirror array instead of collimated light, the output diffracted angle $\theta_m$ also shifts. Residual surface roughness of the mirrored surfaces of the micro-mirrors 55 can also affect the directionality of the reflected diffracted ON-state 60 or OFF-state 62 light. For these reasons, as well as the fact that the incident light beam 20 is often introduced to the micro-mirror array 50 at a compound angle, and thus experiencing a two-dimensional diffraction grating structure, it is difficult to accurately predict or model the diffraction behavior. It is also noted that as the size of the micro-mirrors 55 has decreased, and the feature sizes have become smaller, issues such as mirror tilt variation among DMD micro-mirrors 55 in a device have become more significant and harder to control during device manufacture. Mirror tilt variation may have an impact on device diffraction characteristics.

Figure 2:
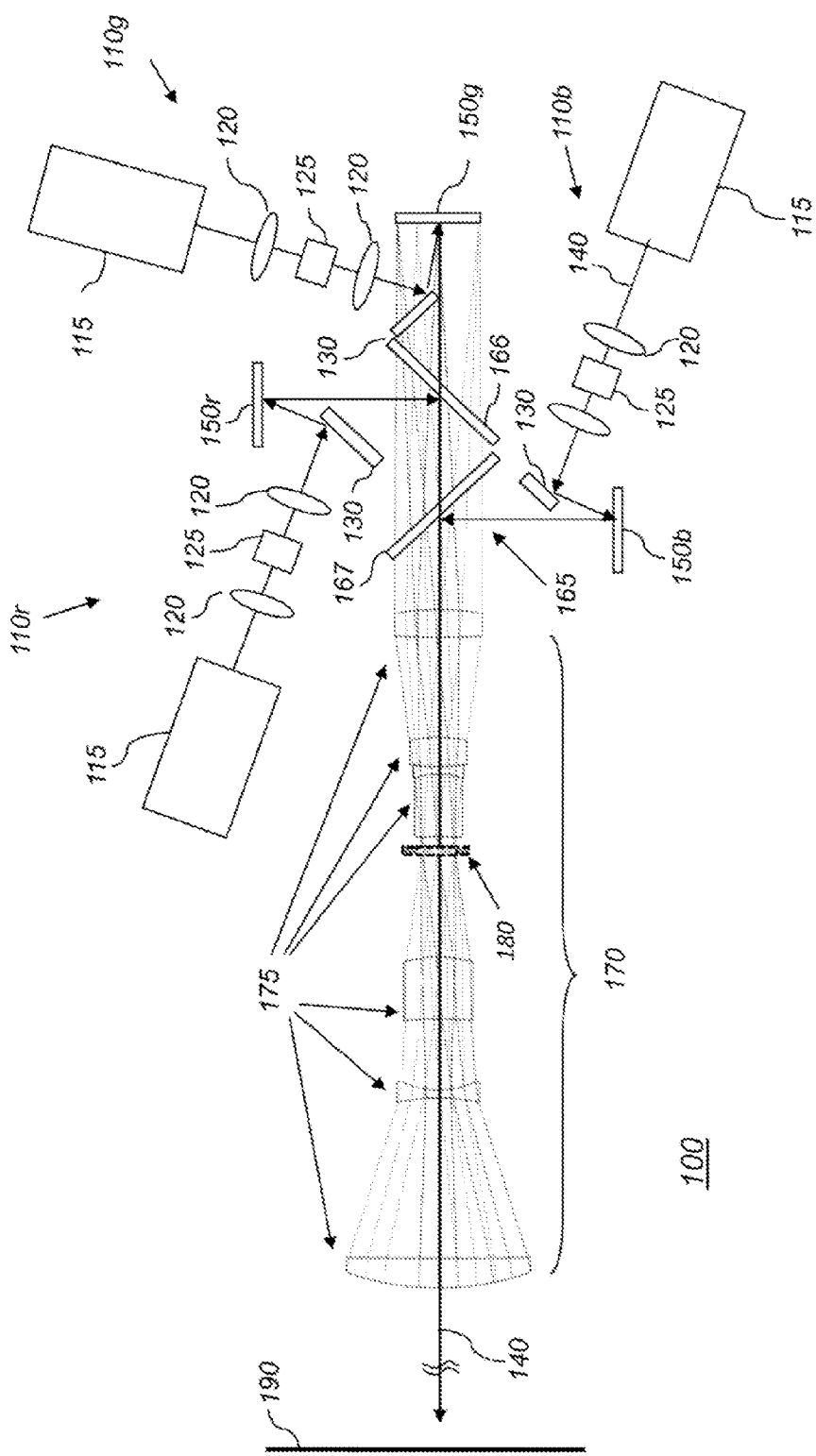
FIG. 2 depicts a portion of an example system architecture for a projection system according to one aspect.

The schematic diagram in FIG. 2 shows an arrangement for a projector 100 that can be used in a number of aspects and features. Three illumination assemblies 110r, 110g and 110b are shown, each configured for providing one of the primary Red, Green, or Blue (RGB) colors from a respective light source assembly 115. The light source assemblies 115 include one or more light sources (not shown), which may be laser light source devices, each of which can have a finite bandwidth ($\Delta\lambda$), and which in aggregate can have a finite color channel bandwidth ($\Delta\lambda_c$). A given laser in a color channel may have a spectral bandwidth of 0.1-1 nm, depending on the underlying technology. The ensemble of lasers in a color channel can then combine to provide a narrow overall spectral bandwidth $\Delta\lambda_c$ that is ~2-7 nm wide. Each illumination assembly 110r, 110g and 110b can include one or more illumination lenses 120, a light integrator 125 (such as a fly's eye integrator or integrating bar, for example) that shapes and directs the transiting light beams, and further illumination lenses 120 and mirrors 130, that together direct illumination light along an optical axis 140 to an associated spatial light modulator 150. For example, incoming light from the light source assembly 115 can be directed into a light integrator 125 using an illumination lens 120. The resulting homogenized light fills an output aperture of the light integrator 125. The output aperture can then be re-imaged to an area in an optical plane to which the spatial light modulator 150 is aligned.

The laser light sources can include lasers devices from Nichia (Tokushima Japan) and Necsel (Milpitas, Calif.). For example, Necsel (previously known as Novalux) offers green (532 nm) and blue (465 nm) laser arrays, each of which provides 3-5 Watts of optical output power. At these power levels, and allowing for system efficiency losses, a modest sized projector (~1500 lumens output) for a lame conference room or a home theatre, can be achieved using a single laser device per color. However, in the case of cinema, the on-screen luminance can involve 10,000-60,000 lumens or 40-240 Watts of combined optical power (flux) incident to the screen, depending on screen size and screen gain. Allowing for internal optical efficiency losses, this can mean that 40-240 Watts of optical power is used from the laser sources in each color channel. Presently, these power levels can be accomplished by optically combining the output of multiple laser arrays in each color channel.

The spatial light modulators 150 can be micro-electromechanical systems (MEMS) devices, such as a DMD or other type of reflective micro-mirror array 50. In the case of DLP-type devices, modulation can provide ON-State or image light that is directed to the display surface, and OFF-State light that is directed into a beam dump (not shown). Projector 100 may be a "three chip" system—a spatial light modulator 150 is provided for each color channel: red 150r, green 150g, and blue 150b. These modulator devices may be subject to supplier testing to identify specific devices that are appropriate for a given color channel. For example, as the human eye has the least imaging resolution for blue perception, blue designated devices (spatial light modulators 150b) may have the most pixel defects (e.g., dead or unresponsive micro-mirrors 55). Modulated image light, bearing image data imparted into the transiting light by the addressed pixels of the spatial light modulators 150 can be combined to traverse a common optical path along an optical axis 140 passing through imaging lens 170 and onto a distant display surface 190 (such as a projection screen). In the illustrated example, a dichroic combiner 165 includes a first combiner 166 and a second combiner 167, each of which can be a dichroic element having appropriate thin film optical coatings that selectively transmits or reflects light according to its wavelength.

Mirrors 130 may not lie in the plane of the optical system. The mirror 130 in the optical path for the green channel can be out of plane, and not obstructing light passing to projection lens 170, as might be otherwise implied by FIG. 2. Additionally, while dichroic combiner 165 is shown as a pair of tilted glass plates, other constructions can be used, including X-prisms, V-prisms, or Philips (or Plumbicon) type prisms. In other aspects, mirrors 130 can be provided in the form of prisms, such as a TIR (total internal reflection) prism used in combination with the Philips prism and DMD devices.

In FIG. 2, imaging lens 170 is depicted as a multi-element assembly that includes multiple lens elements 175 that can image spatial light modulators 150r, 150g and 150b at their respective object planes directly onto an image plane (display surface 190) at high magnification (typically 100×-400×). Imaging lens 170 includes an aperture 180, which may be an aperture stop that limits the f-number or numerical aperture (NA) supported by the imaging optics. For example, aperture 180 can include an iris or a fixed diameter ring that blocks light at the outer edges to define a limiting optical aperture. Imaging lens 170 is an example, and other optics, such as reflective optics, catadioptric optics (reflective and refractive), or a relay optics and projection optics combination, can alternately be used. Projector 100 can also include one or more varieties of de-speckling optics (not shown) to reduce the impact of laser speckle noise.

FIGS. 3a-b depict aspects of light reflection and diffraction from a portion of a micro-mirror array 50 in greater detail. FIG. 3a provides an example of geometry of diffraction from a DMD when considered as a blazed diffraction grating. An incident light beam 20 can be incident to micro-mirror array 50 at an angle $\theta_i$ relative to the device normal. A portion of micro-mirrors 55 can be activated to be tilted to the ON-state, where the mirror tilt angle (e.g., 12°) is equivalent to a grating blaze angle $\theta_b$. As a diffraction grating, diffraction directionality can be modeled by the grating equation, $m\lambda = d(\sin \theta_i \pm \sin \theta_m)$, where m is the diffraction order, d is the grating pitch, $\theta_i$ is the incident angle and $\theta_m$ is the output diffracted light angle. A blazed grating can have the pitch d of a conventional grating, but also tilted surfaces that direct optical flux into a particular order, increasing the efficiency thereof while minimizing while the residual power to the other orders (particularly the zero$^{th}$). For micro-mirrors 55 in the ON-state 60, incident light can be nominally redirected as ON-state light in the direction dictated by a mirrored reflection, but with the efficiency altered by diffraction. Diffraction effects can cause an efficiency loss versus a plane mirrored surface as some light is directed into other diffracted orders, which the blaze then can partially restore.

As shown in FIG. 3b, a variety of emergent light beam 25 or output diffraction orders (m) can be produced, including the 0 order beam ($m_0$), which corresponds to the reflected light direction in the unpowered state. FIG. 3b illustrates an example set of six diffraction orders, of which three orders (m=2, 3, 4) orders can become a cone of ON-state light 60 that is collected through an aperture 85 of optic 80.

Figure 4:
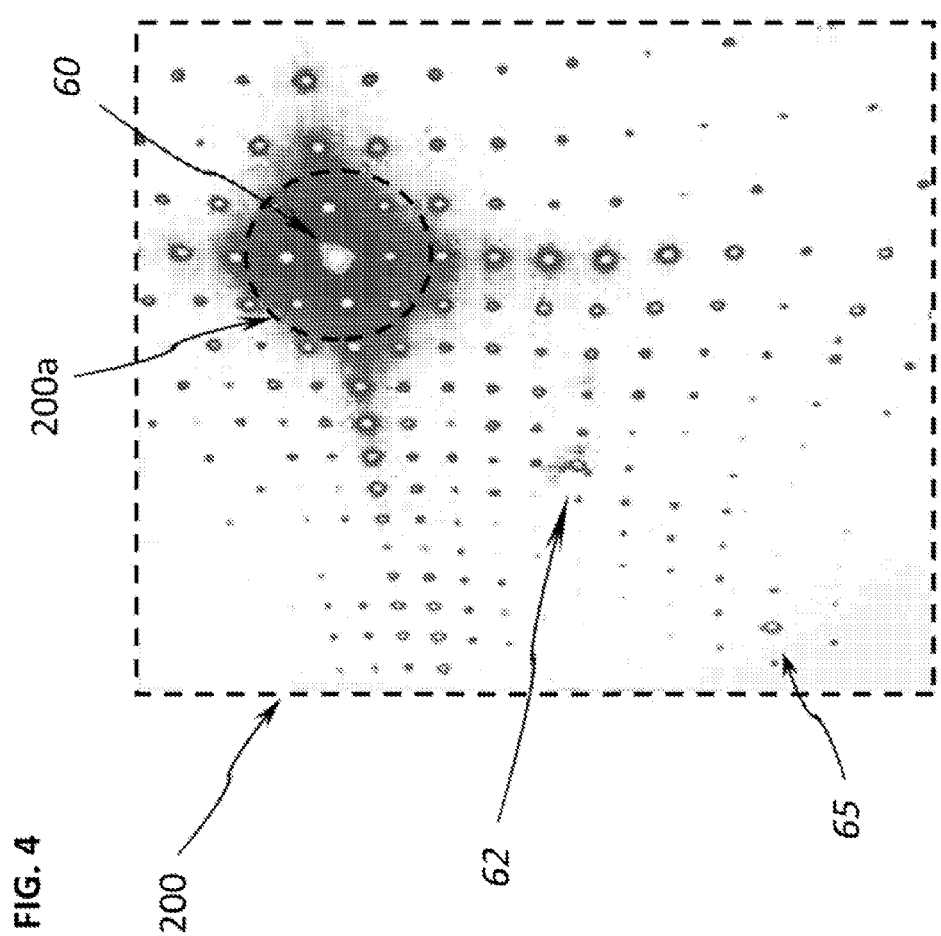
FIG. 4 depicts an example of two-dimensional arrangement of diffraction orders from a micro-mirror array device according to one aspect.

Diffraction from micro-mirror array 50, which can be a mutable two-dimensional grating structure, can be complicated than FIG. 3b suggests. For example, diffraction can occur in two dimensions, instead of in a plane. FIG. 4 depicts an image of a diffraction pattern 200 that is a two-dimensional array of diffraction spots created by directing a collimated laser beam at ON-state pixels of a micro-mirror array 50, generating ON-state diffracted light 60, weak unpowered state light 62 (zero order), weak OFF-state light 65, and numerous other diffraction orders. While the basic position of the diffraction orders can be predicted by the grating equation, the effective ON-state diffracted light 60, representing potentially useful collected light, can span a larger area (diffraction pattern 200a) when convergent or divergent light is directed at the device. This potentially collected diffraction pattern 200a can be more complicated, as the diffraction efficiency and output direction varies as a function of the wavelength and bandwidth of the incident light ($\Delta\lambda_c$), the variation of incidence angle ($\theta_i$) due to having a convergent beam (e.g., at F/6) focused onto the micro-mirror array 50, the tilt variation and surface quality variation of the micro-mirrors 55, and numerous other factors. As a result, the directionality, efficiency, and aggregate light profile of the diffracted light heading in the general direction of the aperture 85, can be difficult to anticipate. Additionally, both the published theory and experimental data available for blazed diffraction gratings is devoted almost exclusively to a special case: the Littrow configuration, where the blaze angle is chosen such that diffraction angle and incidence angle are identical, and the diffracted beam essentially retro-reflects onto the incident beam. The paper, *Echelle Efficiency and Blaze Characteristics*, by M. Bottema, published in the SPIE Proc. Vol. 240, pp. 171-176, (1980) provides a model for diffraction efficiency of an echelle style blazed grating, but as a deviation from Littrow condition. However, the micro-mirrors 55 are not used in the projector at an orientation close to Littrow condition, and they are much more complicated than a fixed grating structure etched in glass.

Figure 5A:
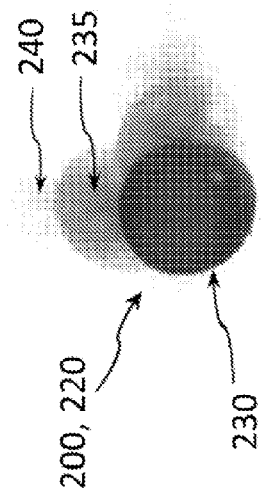
Figure 5B:
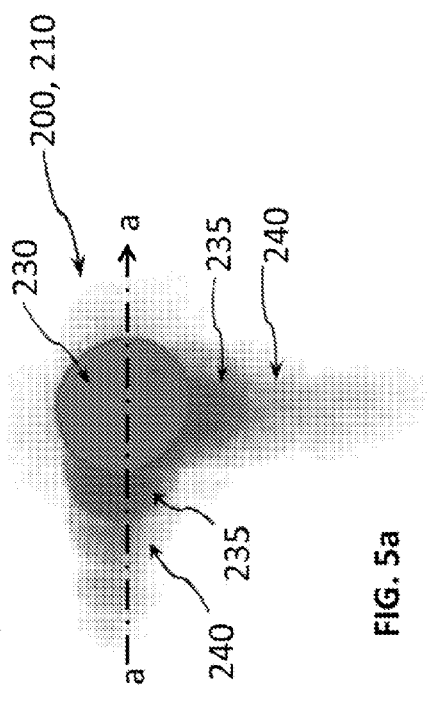
Figure 6A:
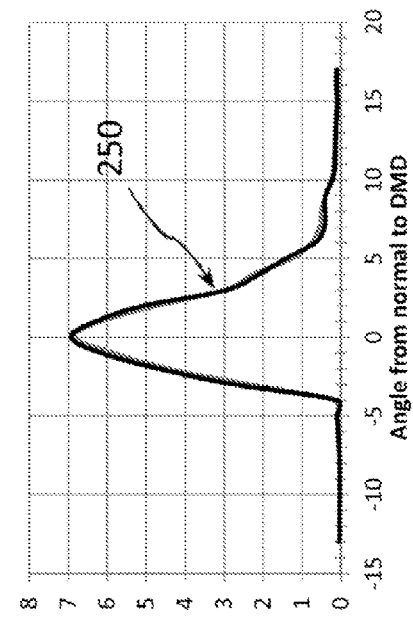
Figure 6B:
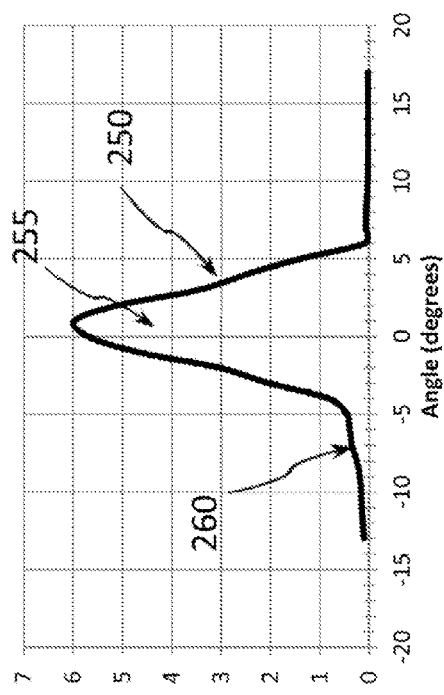

Given the difficulties of predicting the details of diffraction from a micro-mirror array 50 as used in a projection system, detailed bench-test experimental measurements of several DMD devices can be undertaken instead. As a first example, FIG. 5a depicts a diffraction pattern generated in the ON-state with a 4K resolution DMD light illuminated with a convergent F/6 beam of green 543 nm laser light incident to a small portion of the device at a compound incident angle of ~24°. In this case, a left handed diffraction pattern 210 occurs, with dominant secondary diffraction orders 235 and tertiary diffraction orders 240 arranged to the left and downwards from the primary diffracted order 230, and positioned closer to the diffraction order (zero order) for the unpowered state 62. FIG. 6a depicts an associated cross-sectional diffraction profile 250, scanned along axis a-a of FIG. 5a, which has a pronounced diffraction peak 255 that is ~±5° wide, and a noticeable diffraction tail 260 that trails off to the left side. As a second example, FIG. 5b depicts a diffraction pattern, and FIG. 6b depicts the associated diffraction profile 250, for an F/6 beam of green 543 nm laser light incident to a second 4K resolution DMD device. In this second case, a right handed diffraction pattern 220 occurs, with dominant secondary diffraction orders 235 and tertiary diffraction orders 240 arranged to the right and upwards from the primary diffracted order 230, and oriented away from the zero order diffraction order for the unpowered state 62. The diffraction handedness may be a visual or spatial description of the arrangement of the diffraction orders in a plane, although the aggregation of the ON-state orders can describe a complex-shaped beam or cone of light propagating away from the modulator. The images of FIGS. 6a and 6b are converted to gray scale from color images, and the apparent density on paper may not accurately indicate the light intensity.

Relative to the diffraction pattern 200 of FIG. 4, the left handed diffraction profile 210 and the right handed diffraction profile 220 are example portions (200a) of the diffraction pattern 200 that are potentially collectable for imaging experienced for the on-state 60 with convergent incident light instead of collimated light. In the context of FIG. 4, a left handed diffraction pattern 210 has secondary and tertiary diffraction orders closer to the unpowered state 62, and a right handed diffraction pattern 220 has secondary and tertiary diffraction orders further away from the unpowered state 62.

The existence of the left handed and right handed diffraction patterns can make it difficult to optimize the limiting aperture of the collection optic, relative to the numerical aperture or f-number that it can support, particularly as both a high transmittance a high contrast of rejection of OFF-state leakage light may be desired. To optimize a single limiting aperture to support collection of light having a given diffraction handedness for a given incident spectral bandwidth, relative to both transmission and contrast, the characteristic size and shape of the diffraction handedness can be understood. The DMD-style micro-mirror arrays can exhibit diffraction handedness that varies significantly in size and shape when different illuminating spectral bandwidths are applied. Optimizing the aperture to provide both acceptable contrast and efficiency for multiple transiting spectral bandwidths can be difficult.

Figure 7D:
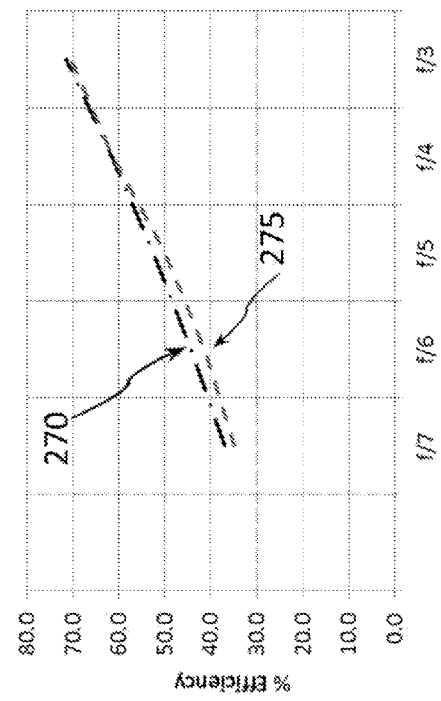
Figure 7C:
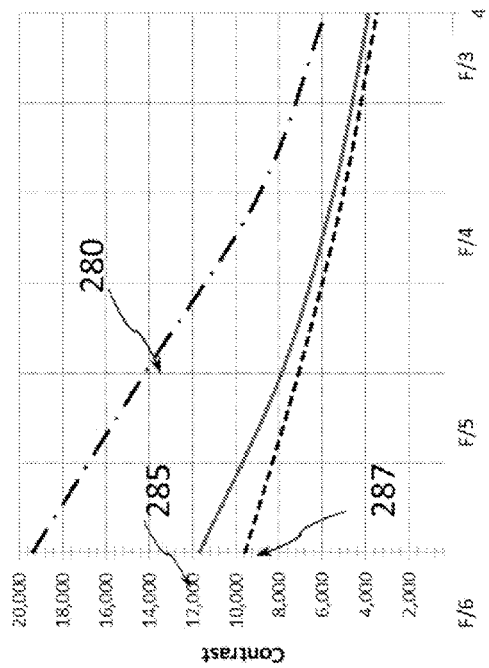

FIG. 7a depicts an example green left handed diffraction pattern 210 of FIG. 5a overlaid with two optical apertures 85. The green left handed diffraction pattern 210 of FIG. 5a can represent a complex beam or cone of light that is expanding out from the micro-mirror array surface and hitting a plane where the aperture 85 resides, where some light is transmitted, and other light is blocked. A small optical aperture can have a radius that supports an f-number (or F#, e.g., F/6) or numerical aperture (NA) that nominally allows only the primary diffraction order 230 into the downstream optics 80 (e.g., projection lens 170). Alternately, it can have a size that supports a smaller f-number (e.g., F/3) or larger NA for which at least portions of the secondary diffracted order 235 and perhaps portions of higher diffracted orders (e.g., tertiary diffracted order 240) are collected into an optical aperture 85. Aperture 85 is depicted as round, but elliptical or more complex shapes can be used. FIG. 7b, which depicts light collection efficiency vs. f-number for green laser light testing of the device providing the FIG. 5a left handed diffraction pattern 210, shows that the light collection efficiency (left handed efficiency 270) to the collection aperture 85 increases as the f-number decreases. This efficiency measurement can be accomplished by holding the illumination F-number at a constant F/6, and varying the collection f-number. Similarly, FIG. 7c shows example data for left handed contrast 280 in green light, demonstrating that the OFF-state contrast for leakage of light into the collection aperture 85 when the device is in the OFF-state increases as the f-number increases. Summarizing this data, a larger f-number can provide better contrast, but less collection efficiency to the aperture 85.

Efficiency and contrast can be examined for micro-mirror arrays 50 providing green left or right handed diffraction patterns 220. For example, FIG. 7b depicts efficiency versus F-number for green laser light testing of the device providing the FIG. 5b right handed diffraction pattern 220, which shows that green laser light collection efficiency increases as the collection F# decreases (corresponding to a larger aperture 85). The left handed collection efficiency 270 of ~62% at F/6 for the left handed diffraction pattern 210 is larger than the right handed diffraction efficiency 275 of ~57% for right handed diffraction pattern 220. Generally, this difference can hold for larger F-numbers (smaller apertures 85), although the two curves converge to the nearly identical efficiency (~71%) for an F/3 aperture. Across the group of devices, efficiencies for F/6 collection of diffracted F/6 green illumination light ranged between 56-65%.

With respect to FIG. 7c, the OFF-state leakage right handed contrast 285 for the device having right green handed diffraction pattern 220 of FIG. 5b also increases for larger F-numbers, but the contrast is lower than experienced with the left handed case (280). Thus, in either case, optimizing f-number for light efficiency (e.g. at F/3) can reduce contrast with a round aperture 85, and optimizing f-number for contrast (e.g. at F/6) reduces efficiency.

A modest sized sample set of DMD micro-mirror arrays 50 have been examined, and the number of left handed diffracting or right handed diffracting devices appears to be about equal, but with the data consistently showing left handed devices in green light to exhibit higher collection efficiencies and higher contrast results than right handed devices in green light. This suggests that 4K DMD micro-mirror optical modulator arrays can be tested and sorted for green light performance, where devices exhibiting left handed diffraction can provide significantly higher efficiency and contrast.

In the case of a 4K DMD micro-mirror array 50 with a 7.5 µm pixel pitch and incident green light at 543 at a compound incident angle of ~24°, the combination of parameters can substantially fulfill the blaze condition, maximizing light into one order (primary order 230), with the presence of convergent incident light increasing the spread into other diffraction orders. By comparison, incident red light in the 630-640 nm range to the 4K DMD devices may not be at blaze condition, and more light can be distributed outside the primary diffraction order 220 than was seen with green light.

In particular, devices in the sample set of 4K DMD micro-mirror arrays 50 can be tested for diffraction, light collection, and contrast performance when exposed to green, red, or blue laser light. FIG. 5c depicts a diffraction pattern generated in the ON-state with a 4K resolution DMD light illuminated with a convergent F/6 beam of red 632 nm laser light incident to a small portion of the device at a compound incident angle of 24°. In this case, a right handed diffraction pattern 220 can occur, with dominant secondary diffraction orders 235 and tertiary diffraction orders 240 arranged to the right and upwards from the primary diffracted order 230. FIG. 6c depicts an associated cross-sectional diffraction profile 250 scanned along axis a-a of FIG. 5c, in which the both the diffraction peak 255 and the diffraction tails 260 are broader than seen in green light. As a second example for an F/6 beam of incident red 632 nm laser light, FIG. 5d depicts a diffraction pattern, and FIG. 6d depicts the associated diffraction profile 250 for a different micro-mirror array 50. In this second case, a left handed diffraction pattern 210 occurred, with dominant secondary diffraction orders 235 and tertiary diffraction orders 240 distributed to the left and downwards from the primary diffracted order 230. The red diffraction patterns of FIGS. 5c-d are larger and more complicated than the green diffraction patterns of FIGS. 5a-b, in part because proportionally more light is present in the secondary diffraction orders 235 and the tertiary diffraction orders 240, and because more light is present in the cross orders 245, thus providing a "messy" diffraction pattern compared to the cleaner ones of FIGS. 5a-b.

As with the green laser light testing, both collection efficiency and contrast for OFF-state leakage can be measured for incident convergent red laser light for different sized apertures 85 equivalent to different F-numbers in the F/6 to F/3 range. FIG. 7d depicts collection efficiency versus F-number, and shows a device exhibiting red right handed diffraction having right handed collection efficiency 270 that is higher (~44%) than a device exhibiting red left handed diffraction with left handed collection efficiency 275 (~41% efficiency) at large f-numbers (e.g. F/6). As with green laser light testing, both the left handed and right handed curves converge to the same approximate efficiency (~70%) at F/3. For the overall group of devices, the efficiency results for F/6 collection of F/6 diffracted illumination red laser light can be lower (39-47%) than seen in green light. For the group of devices, red right handed devices may have higher light efficiency than red left handed devices, although the two groups may be close enough to somewhat overlapping in the range of efficiencies seen at F/6.

Contrast can be examined for the red left and right handed devices. An example curve of contrast for a micro-mirror array that is left handed in red light is depicted in FIG. 7c as left handed red contrast 287. In red light, as in green light, contrast increases as the f-number increases, although red light contrast is generally lower than green light contrast. Devices providing red right handed diffraction tend to have higher red light contrast than devices having red left handed diffraction. Although FIG. 7c does not show a red right handed contrast curve, red right handed contrast can meet or exceed the green right handed contrast 285 shown in the figure. Micro-mirror array devices that provide right handed diffraction in red light may exhibit both higher light efficiency and higher contrast than devices which provide left handed diffraction in red light. But, the differences may be small, and the groups overlap, with some red left handed devices having higher contrast and efficiency than some red right handed devices. Micro-mirror array devices that are left handed in green at 543 nm, can be right handed in red at 632 nm, meaning that given devices that perform the best, tend to do so for both green and red. While this can create a device selection conflict, the left handed to right handed differences may be more distinct in green light, but less distinct in red light, suggesting that there can be greater latitude in selecting devices for red light use.

Figure 7E:
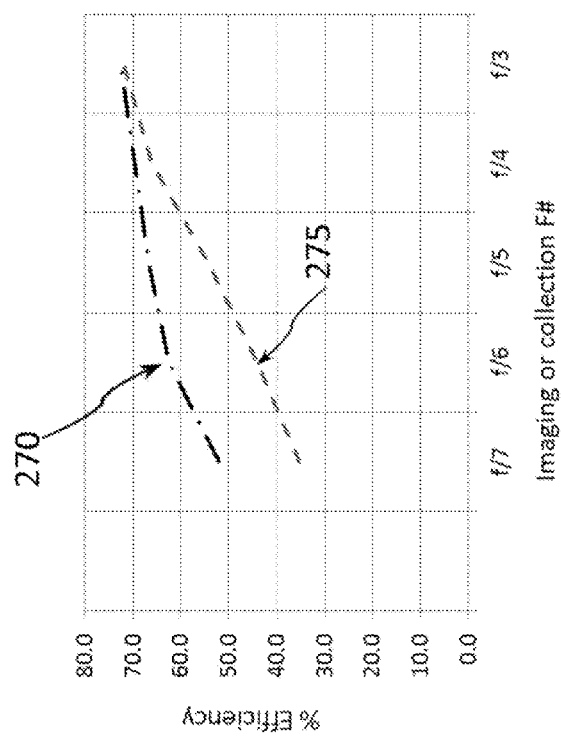

The same group of DMD micro-mirror arrays 50 can be tested by exposure to blue 464 nm laser light. As shown in FIGS. 5e and 6e, left handed diffraction patterns 210 and diffraction profiles 250 seen in blue laser light can be similar to the diffraction patterns seen in green laser light (FIGS. 5a,b). However, FIGS. 5f and 6f depict a blue light right handed diffraction pattern 220 and diffraction profile 250 similar to those seen in red light. These similarities are reflected in FIG. 7e, where collection efficiency maps with the blue handedness, where blue left handed devices have an F/6 left handed collection efficiency 270 for diffracted blue F/6 illumination light of ~62% which is similar to green left handed devices, while blue right handed devices can have a right handed collection efficiency 275 of only ~45%, which is similar to red right handed devices. The micro-mirror arrays 50 that do not exhibit blue light left handedness, but instead exhibited blue light right handedness, may exhibit a greater range of diffracted light distribution than seen in either red or green light. In particular, devices that are not distinctly blue light left handed, may be blue light right handed as depicted in FIG. 6f, or may have an intermediate-handedness where the arrangement of diffraction orders provides nearly symmetrical diffracted light distributions (at least along two axes).

Contrast can be examined for these devices in blue light. Although a curve for blue contrast is not shown in FIG. 7c, devices having blue left handedness can have higher contrast (~1.5×) than devices having blue right handedness; however, the best blue light contrast may be lower than that achieved in either red or green light. While this is not desirable, and may or may not occur in an actual projector, the human eye can be less sensitive to blue light contrast than red or green light contrast, and the differences may be acceptable.

The micro-mirror arrays 50 that are left handed for blue laser light, and have the best blue light efficiency performance, may be the same devices that are right handed in green and had the poorest green light efficiency performance Although left handed diffracting micro-mirror array devices are favored in both green light and blue light, the two sets can be mutually exclusive and not competing for the same devices. By comparison, as handedness favoritism in red seems weak, other selection criteria for red devices (e.g., pixel defects) may have greater priority.

Left or right diffraction handedness, collection efficiency, and contrast can be wavelength dependent in varying device exposure with red (632 nm), green (543 nm), or blue (464 nm) light. The size and shape of the angularly expanding "cone" of light representing OFF-state light 65, which can be collected by beam dump 67, can also vary in size and shape depending on the handedness of the laser illuminated micro-mirror array 50. Diffraction handedness can vary within a color. For example, devices can be tested in blue light at 448 nm. Similar collection efficiencies can be obtained at 448 nm as at 464 nm for the same devices, but the diffraction handedness switched, with devices giving left handed diffraction at 464 nm with higher efficiency, being the right handed diffraction devices at 448 nm that can also have higher efficiency over other devices. In this example, the color channels can be non-overlapping, with a spectral separation between these test sources of $\Delta\lambda_s$~18 nm. If the two sources have spectral bandwidths ($\Delta\lambda_c$) large enough to span this separation bandwidth, then both diffraction handednesses can appear and simultaneously and significantly cancel each other out.

As another example, diffraction handedness can be examined for an alternate red laser wavelength; 664 nm instead of 632 nm. A large spectral separation between wavelengths ($\Delta\lambda_s$=32 urn) can provide a different handedness within a color. In this case, the tested micro-mirror arrays 50 can exhibit red right handed diffraction, but some devices can provide a messy left handed diffraction pattern (similar to FIG. 5c), while other devices can provide a cleaner right handed diffraction profiles (similar to FIG. 5b) with the diagonal orders muted. Devices that provide a messy right handed profile at 632 nm (e.g., FIG. 5d) may include the devices with the cleaner diffraction profile at 664 nm.

In considering the efficiency graphs of FIGS. 7b,d,e, peak efficiency is seen near F/3, regardless of the exposing wavelength, red, green, or blue, or the diffraction handedness experienced for that wavelength. Moreover, at F/3, peak efficiency for the wavelengths converges to a similar narrow range (~69-72%) despite the wide range of efficiency measurements seen at higher f-numbers. In considering, the contrast curves of FIG. 7c, peak contrast is experienced at high f-numbers. This trend may be true for either left or right handed devices, although the actual contrast numbers achieved can vary over a much larger range than the converged peak collection efficiencies do. In the latter case, a small amount of stray light can make a difference in contrast measurements, making the results sensitive to baffling and measurement noise. As a result, optimization of the optical aperture or collection F-number relative to the diffraction handedness of the transiting light can depend on whether collection efficiency or image contrast has greater priority, or a balanced priority may drive an intermediate value (e.g., F/4.5). The optical aperture can determine what portion of the diffracted light is optically useful, in terms of which light will be used for imaging (projection) and which light is rejected (blocked) to reduce stray light and provide image contrast.

Figure 9:
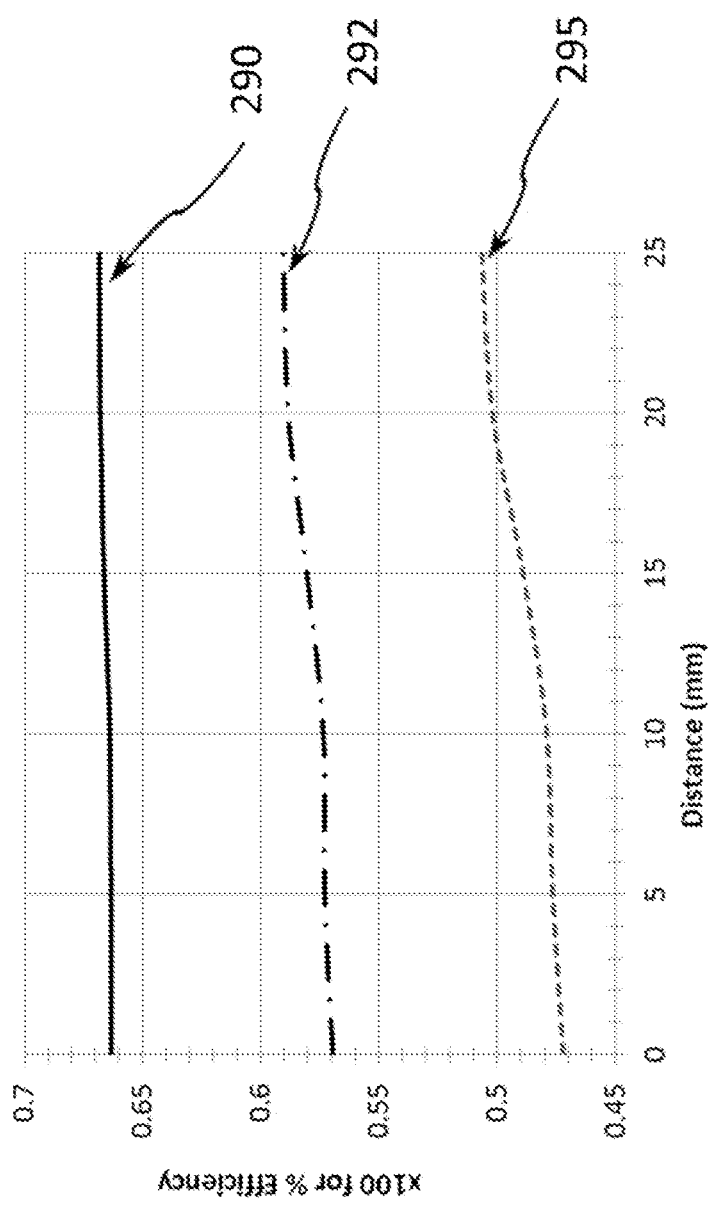
FIG. 9 depicts a graph of efficiency variation versus f-number scanned across a micro-mirror array device according to one aspect.

There may be other factors that can influence this decision however. For example, the tilt of the micro-mirrors 55 can vary across a micro-mirror array 50 due to hinge variations or other causes. This problem may have been exacerbated by the shift to smaller micro-mirror sizes for the 4K resolution DMDs. As a result of these mirror tilt variations, which can average ±0.1° about the average mirror tilt angle)(±12°, the direction of the diffracted light can vary from pixel to pixel, although the variations may be gradual, rather than abrupt across the device. In the case of the diffraction patterns 200 of FIGS. 5a-f, the diffraction patterns can be shifted relative to the fixed collection aperture 85. Enlarging the aperture can reduce this collection efficiency variation. However, if the collection variation efficiency is modest, slowly varying, and preferably constant in time, a uniformity correction mechanism in projector 100 can reliably compensate for this difference. To illustrate this issue, FIG. 9 depicts an example graph of light efficiency variation as scanned positionally across a DMD micro-mirror array 50 with F/7 illumination of red 643 nm light. This graph shows a curve of F/6 efficiency 295, which averages ~48% and which varies between ~47-51% over the device. With an F/3.5 collection aperture, the F/3 efficiency 290 is higher (~66.5%) and the variation is reduced (<0.5% across the device). In the intermediate case with F/5 collection, the F/5 efficiency 292 averages ~57% with a variation of only ±1.0% across the device. Although the optical efficiency can change as the converged spot of illumination light is scanned across the sample micro-mirror array device, the diffraction handedness may not vary with position across the devices. The diffraction handedness for a device may not change with varying incidence angle, although tweaks of illumination incidence angle can modify the directionality of the diffracted light. Whether the incident light is focused onto the micro-mirror surfaces, or before or after those surfaces, may also have little effect on the handedness or efficiency. Diffraction handedness may not depend on the polarization of the incident light, although collection efficiency can be polarization dependent.

As system light efficiency and contrast may be dependent on the diffraction handedness, and handedness can vary with the incident spectral bandwidth, a process can be implemented to test and sort devices. A convergent beam of light having the nominal illumination f-number can be directed at a portion of the micro-mirror array 50. The beam can be focused to illuminate an area representing 1 mm$^2$ or less, or at most several thousand pixels. The resulting arrangement of diffraction orders can then be classified as left handed, right handed, intermediate, or other, either visually or using a machine vision system. Each device can be tested at one or more nominal wavelengths to determine one or more characteristic handednesses for that device, or to provide more detailed data thereof. In a three primary system, such as shown in FIG. 2, that may be manageable, but in the case of a six primary (6P) stereo system, a lot of testing may be performed, as each eye receives a unique wavelength set (e.g. $R_1G_1B_1$ and $R_2G_2B_2$).

Alternately, this example method can be used to statistically correlate different usage spectra with both diffraction handedness and average device micro-mirror tilt, and then devices can be at least initially sorted using measured mirror tilt data. Diffraction handedness may have some correlations. For example, devices that tested left handed in green at 543 nm, may be left handed in blue at 464 nm or right handed in red at 632 nm or right handed in blue at 448 nm. Alternately, as with the 664 nm test, handedness can be constant for all devices, but the diffraction pattern and efficiency can vary on per device basis relative to the strength of the cross orders. As a result, a single test with a single laser color may determine handedness for a range of illumination wavelength situations, and enable a large portion of devices to be sorted quickly for use. On the other hand, a device which tests right handed in green at 543 nm, can produce a wider range of diffraction handedness responses in other wavelengths, and more detailed testing may be in order to properly sort such devices. This type of testing to sort devices for diffraction handedness can also include quick measurements of light collection efficiency and contrast to provide further characteristic data.

As another complimentary approach to sorting devices quickly for diffraction handedness, in the case of DMD micro-mirror arrays, diffraction handedness can correlate with the average mirror tilt across the device. As the micro-mirror size has decreased, including from the DC2k to the DC4k devices, it has become increasingly difficult for Texas Instruments to manufacture a given device meeting a given target ON state mirror tilt, or to provide identical average mirror tilts from one device to another. These problematic mirror tilt variations can also be a process issue related to using a photolithographic stepping process to pattern the large DC4K devices. These mirror tilt variations may be >10× larger than seen with prior generations of devices. For example, devices with average micro-mirror tilts of ~11.8° can provide left handed diffraction patterns for green at 543 nm, or right handed diffraction patterns for red at 632 nm, and can provide advantaged efficiency and contrast results compared to devices that gave right handed diffraction patterns for green at 543 nm, or left handed diffraction patterns for red at 632 nm. These latter devices, which may provide inferior results at 543 nm and 632 nm, and which may have average micro-mirror tilts of ~12.7°, can be the same devices which at 464 nm are left handed and provide superior efficiency and contrast results. If the preferred diffraction handedness is determined by testing in advance for a particular wavelength or spectral bandwidth using a statistically valid sampling of devices, DMD micro-mirrors can be subsequently sorted based on measured mirror tilt angles, with different average mirror tilt angles being preferred for different spectra because they provide a characteristic handedness. Devices with intermediate mirror tilts) (~12.3°-12.4°) may also prove advantaged for certain spectra. Average mirror tilt may be more important than mirror tilt variation, as 4K DMD devices having average mirror tilt variations of ±0.05° to ±0.20° may not suffer significant handedness variations across the device and may provide uniform high efficiencies across the device. Average mirror tilt and mirror tilt variation may be measured by directing a collimated laser beam at the device and looking at the directional variations of the emergent light. It is noted that some DMD micro-mirror arrays may suffer larger peak mirror tilt variations of as much as ~0.5-1.0°, which may affect the handedness or efficiency across the device.

In summary, a convergence in the evolution of two unrelated technologies has introduced new problems that impact the design of projection systems. On the one hand, the pixels in micro-mirror arrays such as the DC4K DMD devices are being fabricated as significantly smaller micro-mirrors than seen previously. In turn, it has become more difficult to control the device manufacturing processes to limit pixel to pixel variations within devices, or between devices. The smaller pixel or micro-mirror sizes, which are now on the order or 10-20 visible wavelengths in size, inherently generate more diffraction effects than previously. These effects are largely hidden when such devices are illuminated with polychromatic light (e.g., white light from a lamp). However, the diffraction from these devices, which act as programmable blazed diffraction gratings, is revealed when narrow bandwidth light, such as from lasers, is directed at the devices. Unexpectedly, laser illumination also reveals diffraction handedness effects that significantly alter the light efficiency and OFF state contrast performance of light collected through an aperture. Moreover, the diffraction handedness, efficiency, and contrast, all vary significantly for any given device depending on what given spectral bandwidth is directed at the device and the mirror tilt variation of that device, as evidenced by the differences seen at the various laser wavelengths. In designing an optical system, such as a laser projector, using narrow bandwidth sources, it then becomes difficult to optimize the light efficiency and contrast performance of the optical system without tailoring the limiting aperture to the diffraction handedness provided by a given device at a given spectral bandwidth or wavelength. It is this problem that the present invention solves. Additionally, the present invention also provides for matching a given limiting aperture to a given micro-mirror array device based on the diffraction handedness for that device at the spectral bandwidth of interest.

Figure 10:
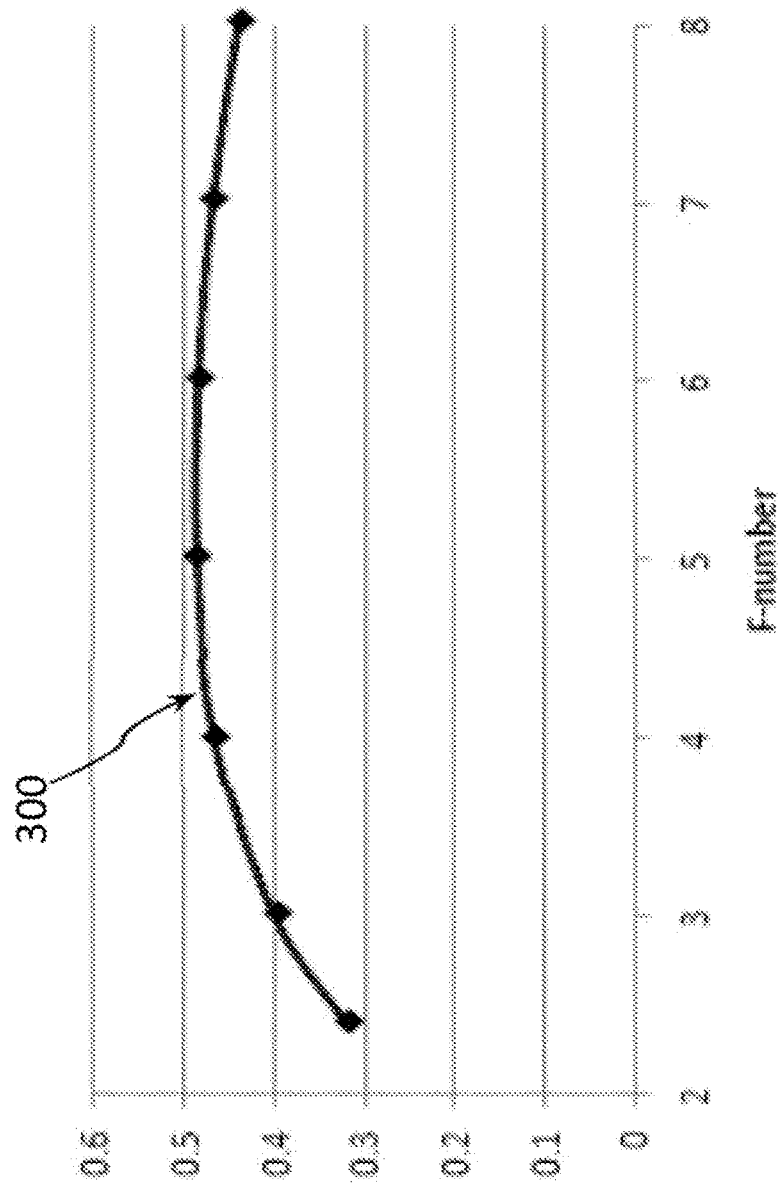
FIG. 10 depicts a graph of projection lens MTF versus f-number according to one aspect.

Image quality, as measured by the modulation transfer function (MTF), can vary with f-number, being moderated by both lens aberrations and lens diffraction. In that regard, FIG. 10 depicts an example curve of MTF 300 versus f-number for a projection lens supporting constant field, but re-optimized for imaging performance for each f-number. In this graph, peak MTF can be obtained in the F/5-F/6 range, and the lowest MTF can be obtained at F/2.5. Relative to the trade-off of MTF versus collection efficiency, an f-number in the F/3 to F/4 range may be a good compromise.

Taking various factors together, including MTF, mirror tilt variation, micro-mirror efficiency, and micro-mirror contrast, relative to system f-number, an optimized aperture 85 supporting an f-number in the F/3.5 to F/5 range may be a good compromise, with an f-number of F/4-F/4.5 range being used. However, this optimized aperture may be a compromise of efficiency and contrast that can be advantaged by screening and selecting for the diffraction handedness of micro-mirror arrays 50 relative to the incident laser light. A different optimized aperture, relative the maximum f-number transmitted, can be determined for one set of micro-mirror array devices, than for another set, even when the same set of illuminating spectra are used. If two projectors are used to support 6p stereo, each having its own spectral set of primaries with different wavelengths from each other, than the two projectors may not have optimized apertures with the same size. Devices can be selected for diffraction left handedness relative to the incident laser light. This process can be used for blue and green laser channels, where the preference for left handed diffraction may be strong, and determination of left handedness versus right handedness may not be in conflict. This diffraction handedness can be determines at least in part by measurements of the nominal average micro-mirror tilt of a given device or by direct measurement with an exposing light source having the appropriate spectral bandwidth.

Figure 8:
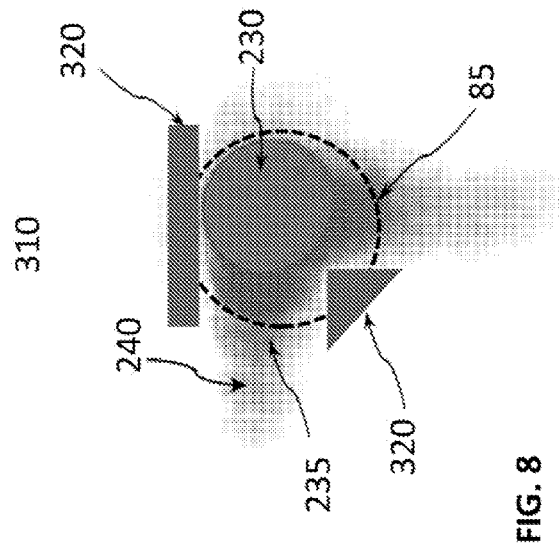
FIG. 8 depicts an example of a color dependent aperture according to one aspect.

A larger optical aperture 85, having a smaller f-number, for example in the F/3.5-F/4 range, can be acceptable if a color dependent aperture 310 is used. For example, as shown in FIG. 8, a color dependent aperture 310, can have light blocking elements 320 placed strategically about the aperture 85 to help enhance OFF-state contrast. These light blocking elements 320 can include dichroic filters, light absorptive filters (e.g., using dyes or pigments), baffles or opaque areas, or combinations thereof. As such, the light blocking elements 320 can provide selective spectral transmission and selective spectral absorption. For example, the light blocking elements can be positioned and shaped advantageously to block blue stray light within portions of the aperture 85 that are adjacent to the primary diffracted order 230 and a secondary diffracted order 235 that include a blue left handed diffraction pattern 210, such as shown in FIG. 5e. The light blocking elements 320 may also reject light from unwanted diffraction orders or residual light from cross orders 245. One possible goal of this blocking element may be to increase contrast for blue light, while having only slight impact on blue transmitted light. If a green left handed diffraction pattern 210, such as shown in FIG. 5a, is largely superimposed on the blue diffraction pattern, the blocking elements 320 may also block green light for the purpose of enhancing green contrast. However, as these left handed diffraction patterns are similar, but not identical, the blocking elements may block or transmit blue or green light differently in different locations. In the example of red laser light with 632 nm light, the red diffraction patterns of FIGS. 5c,d are larger and messier than those for green light. Thus, a larger aperture 85 may be used for red light to support a more comparable transmittance. One or more of the light blocking regions 320 shown in FIG. 8 may be used to transmit red light while blocking green and/or blue light. The light blocking elements can then be dichroic filters or light absorptive filters that at least block blue light or green light, while transmitting red light. The filters for these light blocking regions 320 can be patterned thin film coatings or patterned absorbing colorants, which are typically deposited on a glass substrate.

The example aperture 85 of FIG. 8 can have accompanying light blocking elements 320 that can create a complex aperture shape, which can transmit light beams or cones with complex contour that can vary spectrally. An aperture 85 can also have a simpler shape, and be round, as depicted in FIG. 7a. In that case, the aperture can be sized to allow a portion of the largest spectral beam through (such as light beams for the red diffraction patterns of FIGS. 5c-d), while light beams suffering less diffraction spreading (e.g., light beams for green diffraction patterns of FIGS. 5a-b) can underfill the aperture 85. In the latter case, the aperture can be underfilled non-uniformly, providing a non-uniform f-number that is a different effective f-number than experienced by the first (red) spectra. Thus, for a diffracted spectral bandwidth, it can be appropriate to reference a maximum f-number, a minimum f-number, or an average f-number. Then, for example, the average f-numbers can vary for different color channels based on the micro-mirror array used, and the diffraction handedness and diffraction profile provided by that device for the spectra used.

Although the example projector shown in FIG. 2 is a three chip system, having red, green, and blue spatial light modulators 150 or micro-mirror arrays 50, other projector architectures can be used. For example, in the case of a single chip, color sequential projector, the modulator device can be characterized for diffraction handedness for the three relevant spectral bandwidths, and the illumination beams can be optimized for the diffraction characteristics of a particular color. Although the light sources have been described as lasers, other narrowband spectra light sources, such as filtered LED light sources or super-luminescent diodes (SLEDs), can be used. Although the light sources have been described as visible light sources, non-visible light sources, whether ultraviolet or infrared, can also be used. A "narrow" spectral bandwidth in these other spectral ranges can be different than a narrow spectral bandwidth in the visible spectral range.

Although the methods have been applied to micro-mirror arrays, and specifically to DMD micro-mirror array optical modulators, in principle, the approach can be used with other spatial light modulator technologies for projection and other purposes. As laser light is increasingly used in imaging systems having spatial light modulators, and the pixel and sub-pixel features of these modulator devices become increasingly smaller, optical diffraction may have an increasing impact. In circumstances where diffraction pattern differences among devices and spectral bands occur, such as handedness, or equivalents thereof, the color dependent aperture approach can again be applied.

The foregoing description of features, including illustrated features, has been presented only for the purpose of illustration and description and is not intended to be exhaustive or to limit the invention to the precise forms disclosed. Numerous modifications, adaptations, combinations, sub-combinations, and uses thereof will be apparent to those skilled in the art without departing from the scope of this invention.

What is claimed is:

1. An optical system for modulating an incident light beam, the optical system comprising:
    an illumination source for providing the incident light beam having a defined narrow spectral bandwidth that is 10 nm or less;
    an optical element having an aperture of a size and a shape for transmitting portions of a modulated light beam and blocking remaining portions of the modulated light beam; and
    a micro-mirror array optical modulator for selectively modulating the incident light beam to encode data thereon based on commands to an ON-state or an OFF-state of one or more micro-mirrors to form the modulated light beam, the micro-mirror array optical modulator being selected from a plurality of micro-mirror array optical modulators by being matched to the size and shape of the aperture in that the modulated light beam has an ON-state light efficiency and an OFF-state contrast that depend on a diffraction handedness pattern of the modulated light beam relative to the size and the shape of the aperture, wherein the optical system is configured to have an f-number in a range of F/3.5 to F/6.

2. The optical system of claim 1, wherein a micro-mirror in the micro-mirror array optical modulator is smaller than 20 wavelengths of the incident light beam.

3. The optical system of claim 1, wherein the micro-mirror array optical modulator is configured for outputting the modulated light beam with the diffraction handedness pattern that is defined by a relative arrangement of at least a primary order of diffraction and dominant secondary orders of the ON-state relative to an unpowered state.

4. The optical system of claim 1, wherein the diffraction handedness pattern is based on a tilt of a micro-mirror of the micro-mirror array optical modulator.

5. The optical system of claim 1, wherein the diffraction handedness pattern is a left-handed pattern, a right-handed pattern, or an intermediate pattern.

6. The optical system of claim 1, wherein the micro-mirror array optical modulator is testable to determine a characteristic diffraction handedness pattern for one or more spectral bandwidths.

7. The optical system of claim 6, wherein the micro-mirror array optical modulator is configured to be tested using incident light having a selected spectral bandwidth directed at the micro-mirror array optical modulator and characterizing an arrangement of diffraction orders relative to an unpowered state zero order.

8. The optical system of claim 1, wherein the illumination source includes a first illumination source and a second illumination source that are configured to provide visible light and to have a narrow spectra bandwidth that is less than or equal to 7 nm.

9. The optical system of claim 1, wherein the size of the aperture is based on system light efficiency, contrast, image quality, modulation transfer function, or efficiency variability across the micro-mirror array optical modulator.

10. The optical system of claim 9, wherein the shape and the size of light blocking portions of the aperture are configured to block light at edges of a primary diffraction order and at least one adjacent secondary diffraction order.

11. The optical system of claim 1, wherein the micro-mirror array optical modulator is a digital micro-mirror device.

12. The optical system of claim 1, wherein the optical system is an optical projection system for providing images to a display surface.

13. The optical system of claim 1, wherein the optical element is a projection lens.

14. The optical system of claim 1, further comprising a second illumination source for providing a second incident light beam having a second defined spectral bandwidth to a second micro-mirror array optical modulator that is selected based on a desired performance of light efficiency and contrast of the second modulated light beam from the second micro-mirror array optical modulator depending on the size and shape of the aperture.

15. The optical system of claim 14, wherein the narrow spectral bandwidth and the second spectral bandwidth are non-overlapping.

16. The optical system of claim 14, wherein the aperture of the optical element is configured to transmit a different effective f-number for the narrow spectral bandwidth than for the second spectral bandwidth.

17. An optical system for modulating an incident light beam, the optical system comprising:
an illumination source for providing the incident light beam having a defined narrow spectral bandwidth that is 10 nm or less;
a micro-mirror array optical modulator for selectively modulating the incident light beam to encode data thereon based on commands to an ON-state or an OFF-state of one or more micro-mirrors to form the modulated light beam; and
an optical element having an aperture of a size and a shape for transmitting portions of a modulated light beam and blocking remaining portions of the modulated light beam, the size and the shape of the aperture being matched to the micro-mirror optical modulator in that the modulated light beam has an ON-state light efficiency and an OFF-state contrast that depend on a diffraction handedness pattern of the modulated light beam relative to the size and the shape of the aperture, wherein the optical system is configured to have an f-number in a range of F/3.5 to F/6.

18. The optical system of claim 17, wherein a micro-mirror in the micro-mirror array optical modulator is smaller than 20 wavelengths of the incident light beam.

19. The optical system of claim 17, wherein the micro-mirror array optical modulator is configured for outputting the modulated light beam with the diffraction handedness pattern that is defined by a relative arrangement of at least a primary order of diffraction and dominant secondary orders of the ON-state relative to an unpowered state.

20. The optical system of claim 17, wherein the diffraction handedness pattern is based on a tilt of a micro-mirror of the micro-mirror array optical modulator.

21. The optical system of claim 17, wherein the illumination source includes a first illumination source and a second illumination source that are configured to provide visible light and to have a narrow spectra bandwidth that is less than or equal to 7 nm.

22. The optical system of claim 17, wherein the shape and the size of light blocking portions of the aperture are configured to block light at edges of a primary diffraction order and at least one adjacent secondary diffraction order.

* * * * *